June 27, 1939. R. T. AXE Re. 21,126

WINDOW CONSTRUCTION

Original Filed May 17, 1935 2 Sheets-Sheet 1

INVENTOR.
Roy T. Axe.
BY
Bidwell & Thompson.
ATTORNEYS.

June 27, 1939. R. T. AXE Re. 21,126

WINDOW CONSTRUCTION

Original Filed May 17, 1935 2 Sheets-Sheet 2

INVENTOR.

BY Ray T. Axe

Bridell & Thompson

ATTORNEYS.

Reissued June 27, 1939

Re. 21,126

UNITED STATES PATENT OFFICE 21,126

WINDOW CONSTRUCTION

Roy T. Axe, Syracuse, N. Y., assignor to The O. M. Edwards Company Inc., Syracuse, N. Y., a corporation of New York Original No. 2,067,654, dated January 12, 1937, Serial No. 22,028, May 17, 1935. Application for reissue January 6, 1939, Serial No. 250,381

12 Claims. (Cl. 189—64)

This invention relates to window constructions, and particularly to a double sash construction where there is a space between the glass panes, and has for its object a sash consisting of opposing complemental sections, each of which supports a glass pane, and means for clamping the complemental sections together and also means for sealing the space between the glass panes, which means is individual to the sections and coact with each other to seal the space when the sections are clamped together, so that the sections can be readily demounted and replaced and the sealing means separate and come into coaction without attention on the part of the workman.

It further has for its object, a particularly simple and efficient window frame and sash construction, whereby the sash is readily mounted in the window frame by fastening members extending transversely through the sash frame and into the window frame.

It further has for its object, a particularly simple coupling by which the atmosphere between the glass panes can be readily changed or dehydrated at intervals, or dry air substituted for moisture-laden air.

The invention consists in the novel features and in the combinations and constructions hereinafter set forth and claimed.

In describing this invention, reference is had to the accompanying drawings in which like characters designate corresponding parts in all the views.

Figure 1 is a fragmentary elevation of a window frame embodying my invention.

Figures 2 and 3 are sectional views on lines 2—2, and 3—3, respectively, Figure 1.

Figures 1, 2:
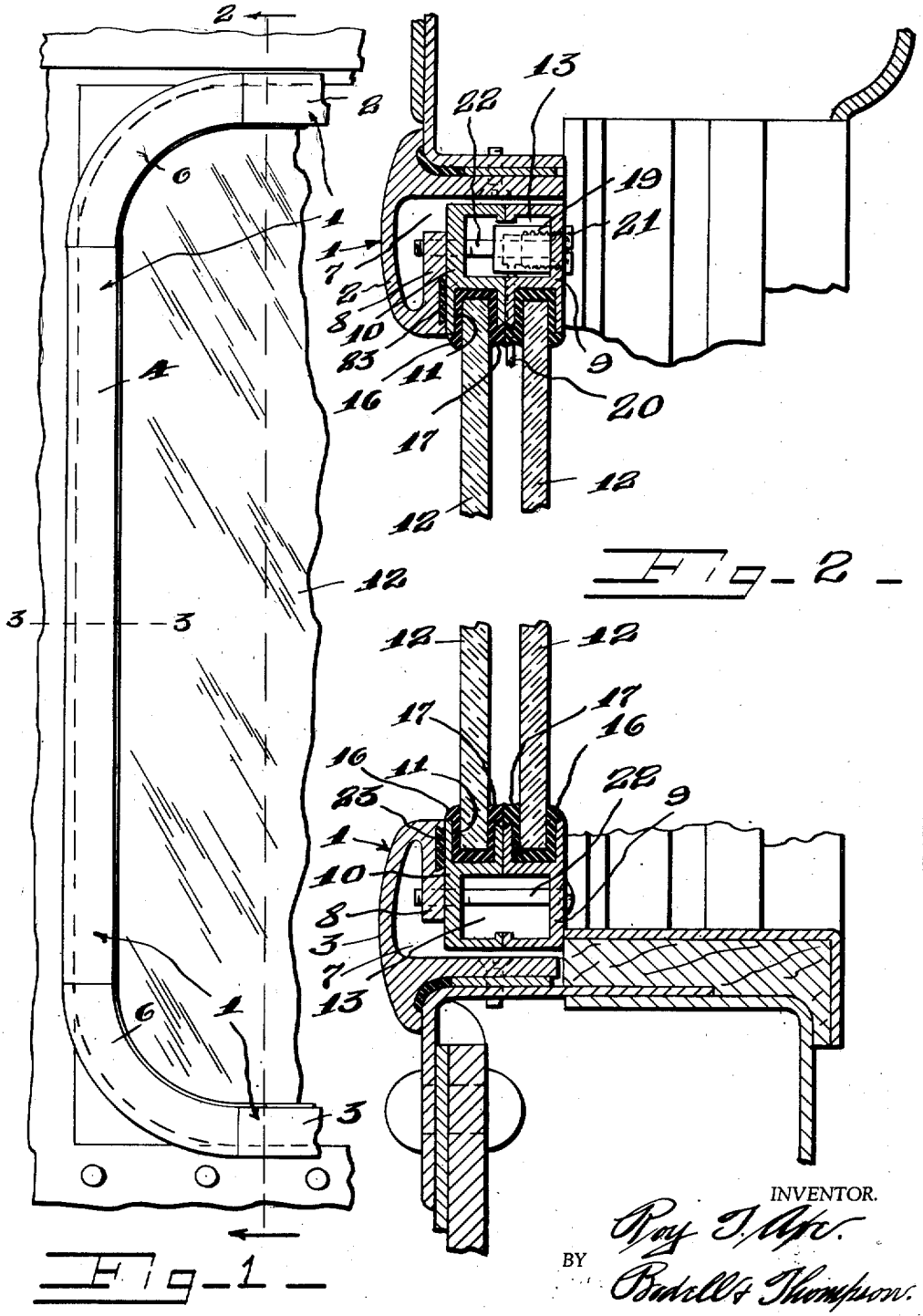
Figure 3:
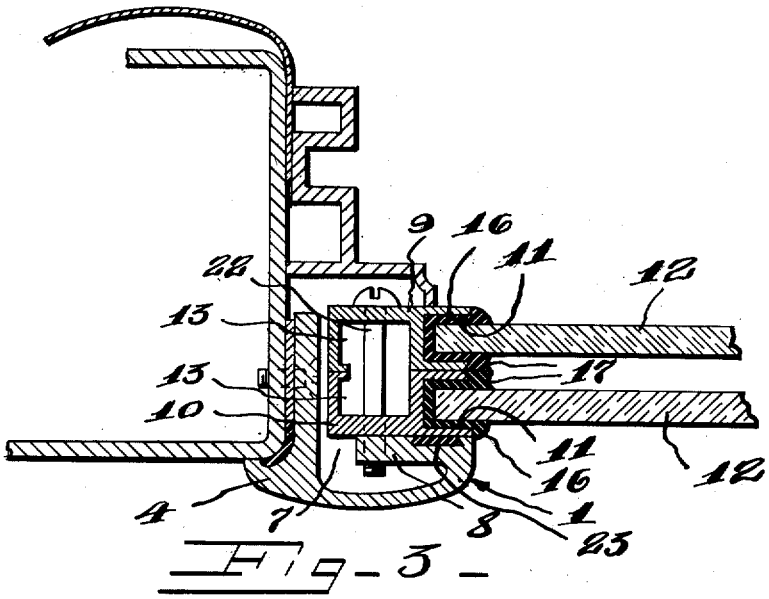

1 designates a window frame which is made up of upper and lower frame members 2, 3 and side upright members 4, these members being here shown as connected by round corner pieces 6. The window frame, as seen in Figures 2 and 3, is angular in cross section and usually formed of metal and formed with a recess 7 for receiving the sash frame, this recess being open on three sides and being provided with an internal abutment 8 to which the sash frame is clamped, the frame being open on the side thereof opposite the abutment.

The sash frame is formed of opposing complemental sections 9, 10, each of which includes top rails and stiles. Each section is formed with a hollow body portion and with channels or grooves 11 for receiving the margins of the glass panes 12, the channels extending parallel to each other. The bodies of the sections are formed with channels 13 and the channels of one section are opposed to and face the channel of the other. The two sash sections are clamped together in any suitable manner, as by clamping screws 14, extending transversely through the hollow body portions or the channels 13 thereof, and as here shown, the clamping screws 14 thread into sleeve screws 15.

The glass panes 12 are sealed in the grooves 11 by sealing means, here shown as channel-shaped strips 16, or strips U shaped in general form in cross section, of yielding or compressible sealing material, usually rubber, and the sealing means in one groove is entirely independent and separable from the other, and each of these sealing strips is provided with an angular portion 17 located between the glass panes outside of the grooves which compress one against the other when the sections 9, 10 are clamped together by means of the screws 14, so that the air space between the glass panes is sealed. Usually, the air between the glass panes is dehydrated, in order to prevent condensation on the panes and clouding, and also means is provided for changing the air or dehydrate the air at intervals.

In the illustrated embodiment of my invention, one of the sash sections is formed with a chamber 19 therein which, through a suitable passage or tube 20 communicates with the space between the glass panes 12, this tube extending through one of the sealing strips. The chamber is provided with an opening normally closed by a plug 21 by means of which the chamber can be coupled to a dehydrating tube, or a tube for withdrawing moisture-laden air from the space between the glass panes and filling the same with dehydrated air. This dehydrating tube is usually located in the top rail of the sash.

The sash sections, when assembled, are secured in the recess of the window frame 1 and press against the abutment 8 and are secured thereto by means of screws 22 extending through the sections 9, 10 from the open side of the recess 7 and thread into the abutment 8. Usually, a suitable packing strip 23 is located in a suitable groove in the abutment and presses against the sash.

Figure 4:
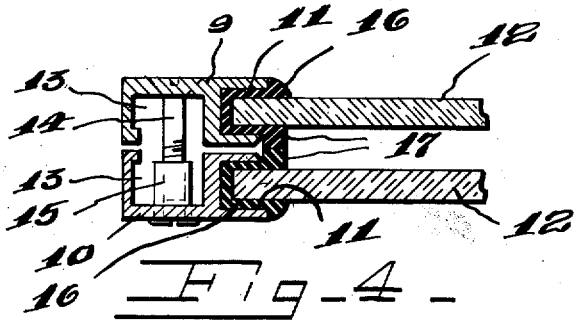
Figure 4 is a fragmentary sectional view through the sections of the sash showing the same in their position assumed before being tightened together and pressing the sealing means tightly together.
Figure 5:
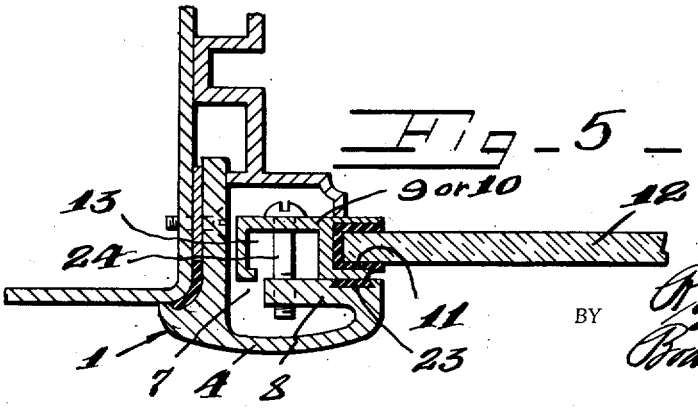
Figure 5 is a fragmentary, transverse, sectional view through the window frame and the sash, when but a single glass pane is used, or one section used as the entire sash.

Owing to the sealing strips and the opposing complemental sash frames, the sealing strips are compressed into snug sealing engagement during the tightening of the screws 14 and before the screws are tightened occupy a position such as is shown in Figure 4, and when tightened assume a position similar to that shown in Figure 2. Also, during clamping of the sections together, the sealing means in each glass receiving channel compresses against the glass and the walls of the channel. In the event it is desired to have a single sash instead of a double sash in certain locations, one of the sash frames, 9, 10, can be secured to the window frame, or the abutment 8 thereof, by a screw 24, as seen in Figure 5.

What I claim is:

1. In a double window sash construction, the combination of opposing sash frame sections, each having channels for holding a glass pane independently of the other, means for clamping the sections together, and compressible sealing means between the sash sections and individual thereto, and arranged to compress one on the other when the sash sections are clamped together.

2. In a double window sash construction, the combination of opposing sash frame sections, each having channels for holding a glass pane independently of the other, means for clamping the sections together, and compressible sealing means in the channel between the margins of the glass panes and the walls of the channels and having portions extending laterally into the space between the panes, whereby the sealing means of the sections compress together and against the margins of the panes and the walls of the channels when the sections are clamped together.

3. In a double window sash construction, the combination of opposing sash frame sections, each having channels for holding a glass pane independently of the other, means for clamping the sections together, and compressible sealing means in the channel between the margins of the glass panes and the walls of the channels, and having portions extending laterally into the space between the panes, whereby the sealing means of the sections compress together and against the margins of the panes and the walls of the channels when clamped together, the sealing means for each section being independent of that of the other, whereby they separate out of sealing engagement when the sections are separated and come into compressing sealing coaction when the sections are clamped together.

4. In a double window sash construction, the combination of opposing sash frame sections, each having channels for holding a glass pane independently of the other, compressible sealing means for the glass arranged in the channels, the sealing means in each channel having a portion projecting toward that in the other channel and located between the glass panes for engaging a similar portion of the other section, and means for clamping the sections together and compressing said portions of the sealing means one on the other.

5. In a double window sash construction, the combination of opposing sash frame sections, each comprising a body portion in the form of a channel facing the channel of the body portion of the other section and each having a channel located outside of the channel of the body for receiving the margin of one of the glass panes, the glass receiving channels of the sections extending parallel to each other and means for clamping the sections together, whereby the channels of the body portions form a hollow frame, compressible glass sealing means in the glass receiving channels, each having a portion extending toward the similar portion of the other sealing means, said portions compressing one on the other, when the sections are clamped together.

6. In a window construction, a sash frame formed with a recess having an internal abutting surface on one side thereof, the opposite side being open, a sash including opposing sash frame sections, each comprising a body portion, and a channel outside the body portion for receiving the margin of the glass pane, the channels of the sections extending parallel to each other, means extending transversely through the bodies of the sections for clamping them together and additional means extending through the body portions of the sash frame sections from the open side of the recess and extending into said abutment for securing the sash frame sections to the window frame.

7. In a double window sash construction, the combination of opposing complemental sash frame sections, each having a channel for receiving a glass pane, the channels extending parallel to each other, sealing means in the channels and extending laterally outside of the channels toward each other, and means for clamping the sections together for causing the sealing means to compress one on the other.

8. In a double window sash construction, the combination of opposing complemental sash frame sections, each having a channel for receiving a glass pane, the channels extending parallel to each other, sealing means in the channels and extending laterally outside of the channels toward each other, and means for clamping the sections together for causing the sealing means to compress one on the other, the sash being provided with a chamber therein for coupling to a dehydration tube, and a passage connecting said chamber with the sealed space between the panes of the sashes.

9. In a double window sash construction, the combination of opposing complemental sash frame sections, each having a channel for receiving a glass pane, the channels extending parallel to each other, sealing means in the channels and extending laterally outside of the channels toward each other, and means for clamping the sections together for causing the sealing means to compress one on the other, the sash being provided with a chamber therein for coupling to a dehydration tube, and a passage connecting said chamber with the space between the panes of the sashes, said passage extending through one of said sealing means.

10. In a double glass sash construction, the combination of opposing sash sections, each having means including mounting or glazing strips for providing a channel for holding glass panes respectively, means for clamping the sections together and compressible sealing means positioned between the margins of the glass panes, self-contained as a unit with at least one of the strips for one of the glass panes, and arranged to be compressed and to compress against the margins of the glass panes when the sash sections are clamped toward each other.

11. In a double glass sash construction, the combination with a sash provided with means for supporting spaced apart glass panes and including mounting or glazing strips providing a channel for holding the margins of said panes, the sash including opposing sections, and means for clamping the sections toward each other; of spacer and sealing means of compressible resilient material located between the margins of the panes, self-contained with at least one of the strips for one of the glass panes, and arranged to compress against the inner surfaces of margins of panes only, inward from the edges of the panes, upon clamping of the sash sections toward each other, and mounted in the sash so that the compression force of the clamping means is transferred transversely through the margins of the glass panes to the inward of the outer edges of the glass panes.

12. In a double glass sash construction, the combination with a sash provided with means for supporting spaced apart glass panes and including mounting or glazing strips for providing channels for the margins of the glass panes; of spacing means of resilient compressible material located between the margins of the glass panes and arranged to be compressed against the margins of the glass panes only to the inward of the edges of the glass panes said spacing means being self-contained with at least one of the mounting strips of one of the glass panes, and means operable to apply compression force to the margins of the panes and the spacing means, only to the inward of the edges of the glass panes, said spacing means being arranged to be free of compression along transverse lines extending beyond the edges of the panes.

ROY T. AXE.